S. Q. KLINE, Jr.
ELECTRIC CIRCUIT CONTROLLING MECHANISM.
APPLICATION FILED APR. 13, 1915.
1,179,933.
Patented Apr. 18, 1916.
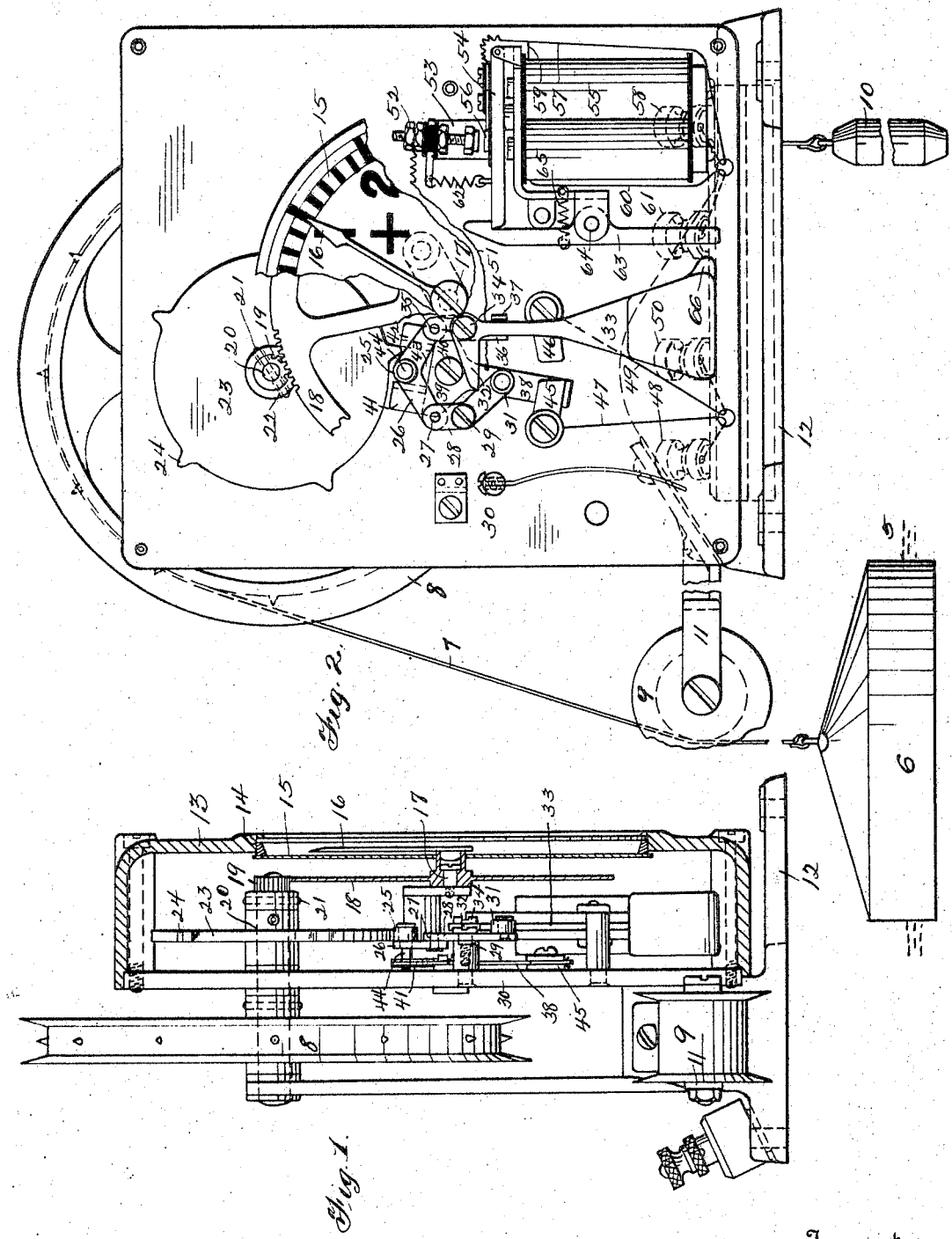
Witnesses
Herbert M. Campbell
S. Clepatch
Inventor
Seth Q. Kline, Jr.
By Shepherd Campbell
Attorneys

UNITED STATES PATENT OFFICE.

SETH Q. KLINE, JR., OF WASHINGTON, DISTRICT OF COLUMBIA.

ELECTRIC-CIRCUIT-CONTROLLING MECHANISM.

1,179,933. Specification of Letters Patent. Patented Apr. 18, 1916.

Original application filed November 5, 1914, Serial No. 870,461. Divided and this application filed April 13, 1915. Serial No. 21,116.

*To all whom it may concern:*

Be it known that I, SETH Q. KLINE, Jr., a citizen of the United States, residing at Washington, in the District of Columbia, have invented certain new and useful Improvements in Electric-Circuit-Controlling Mechanisms, of which the following is a specification.

This invention relates to electric circuit controlling mechanism intended primarily for use in conjunction with an apparatus for indicating at a distant point the level of a body of water but being also capable of use in many relations where the movement of one member is utilized to impart the necessary movement to circuit opening or closing means to properly control the desired circuits.

This application is a division of my co-pending application Serial Number 870,461, filed November 5, 1914, which application relates to an apparatus for indicating at a distant point the level of a body of water and with which type of apparatus the circuit controlling mechanism herein shown and described is particularly adapted for use.

In the accompanying drawings:—Figure 1 is a view partly in elevation and partly in transverse section of a circuit selecting or controlling mechanism hereinafter shown, and Fig. 2 is a face view of the mechanism shown in Fig. 1 with certain of the parts broken away.

Like numerals designate corresponding parts in both of the figures of the drawing.

Referring to the drawing, numeral 5 designates a body of water the height of which it is desired to indicate at a distant point. A float 6 rises and falls with the water, and this float has connected thereto a cord, wire or cable 7, which passes over a grooved pulley 8 and over an idler pulley 9, and has attached to its opposite end a counter weight 10. The idler pulley 9 is carried by a bearing 11 which is secured to the base block 12 of a circuit selecting or controlling mechanism which will now be described.

Mounted upon the base block 12 is a suitable casing 13 provided with a sight opening 14 through which a dial 15 is visible. A hand or pointer 16 moves over this dial to constitute a local indicator. The pointer 16 is carried by a shaft 17 and this shaft carries a gear wheel 18 which meshes with a pinion 19 that is fast upon a shaft 20, and the pulley 8 is likewise fast upon this shaft. It is apparent, therefore, that through these connections, movement of the float will be imparted to the pointer 16. The shaft 20 carries a pin 21 which extends beyond the shaft and enters cut-out portions 22 of the hub of a disk 23, and these cut-out portions are of such width that there is a slight lost motion between the disk 23 and shaft 20, the purpose of which will be hereinafter set forth. The disk 23 is provided with peripheral lugs 24, which in their rotation are arranged to contact with a roller 25 that is mounted upon an angle arm 26. This angle arm is pivoted at 27 to one end of a bent lever 28, which lever is in turn pivoted at 29 to a plate 30. At its other end this lever carries a roller 31. Therefore, when the disk 23 rotates in a clockwise direction, (see Fig. 2) and one of the lugs 24 contacts with roller 25, angle arm 26 is shifted bodily to the left and the bent lever 28 is swung upon its pivot 29 to cause the roller 31 to contact with and raise an extension 32 of a weight 33, which weight is pivoted at 34. It is apparent that this will swing the lower part of the weight toward the left in Fig. 2. If, however, the movement of the water is such as to cause the disk to rotate in an anti-clockwise direction, then the movement of the angle arm 26 will be toward the right in Fig. 2, and the weight will be moved in the same direction as before, due to the fact that the end of the angle arm opposite to the pivot 27, is pivoted at 35 to a lever 36 which has a projection 37 engaging behind a portion of the weight, and which lever is pivoted upon the pivot 34. Therefore, when the angle arm 26 is moved bodily toward the right, the lower end of lever 36 will be moved toward the left and the weight will be moved in the same direction as before. But while the movement of this weight is always the same, the movements of the disk 23 in one direction or the other are caused to actuate a switch to select one or the other of a pair of circuits. This switch comprises a blade 38 and a head 39 and is pivoted at 40 to plate 30. The head carries extensions 41 and 42 which are spaced from each other to leave a recess 43 between them, in which recess a pin 44, concentric with roller 25, plays. The blade 38 is arranged to be moved into engagement with either of contacts 45 or 46. Contact 45 is in communication, through a conductor 47, with a binding post 48, while contact 46 is in communication, through a conductor 49, with a binding post 50.

The switch blade proper is connected by a conductor 51 with a contact element 52 that is carried by a fixed support 53. The armature bar 54 of a magnet 55 carries a complemental contact point 56, which is in communication, by a conductor 57 with a binding post 58. A branch 59 leads from this conductor 57 through the windings of the magnet 55 and through a conductor 60 to a binding post 61. A spring 62 normally tends to lift the armature bar 54 to bring the contacts 52 and 56 into engagement with each other. But this bar is normally restrained by a latch 63 which is pivoted at 64 and is normally drawn by a spring 65 into position to engage the armature bar and to restrain it from moving upwardly. Now, therefore, if the disk 23 be rotated in a clockwise direction in Fig. 2, and one of the lugs 24 thereof contacts with roller 25, the switch is moved to bring the lower end of its blade into engagement with contact 46, and at the same time the weight is lifted as described. As soon, however, as the lug passes over the center of the roller, the lost motion engagement provided by pin 21 and the cut-out portion 22 of the hub of the disk permits this disk to have a quick, forward, movement and this in turn permits the weight to drop freely to restore arm 26 and the connected parts to neutral position; and when this weight drops, a tail 66 thereof contacts with the lower end of the latch 63 and moves the latch against the action of spring 62 to release armature bar 54, whereupon, spring 62 lifts this bar and completes the circuit between the conductors 51 and 57. This selecting and controlling of a circuit is utilized at a distant point to indicate the rise and fall of the liquid 5 through the medium of an indicating mechanism forming no part of the present invention, which indicating mechanism forms the subject matter of a separate application. The quick forward movement permitted the disk when the lug 24 passes over the center of the roller prevents any movement of the switch until shaft 20 has definitely moved its predetermined travel as will be readily understood.

It will be noted that the switch is positively moved to select and close its circuit before the weight acts to complete said circuit and thereby burning and pitting of the contact points are avoided. It is highly undesirable in devices of this character to have the contact elements directly carried by and movable with the float, for the reason that where the rise of the water is a slight one, and it usually is, when these contact points get nearly into contact with each other, arcing results and the contact points are badly burned and pitted. Furthermore, in devices where the contact points are directly carried by the float, when they get nearly into contact with each other, there may be an irregular movement of the float that will cause contact to be made and momentarily broken and then made again. In the present apparatus all these possible weaknesses are effectually guarded against.

From the foregoing it will appear that the function of this switch is to select and subsequently close one or the other of a pair of circuits, it being understood that these circuits (not shown) will be connected respectively to the binding posts 48 and 50. If it is the circuit that is connected to binding post 48 that is to be closed, then the circuit is from binding post 48, conductor 47, contact 45, switch blade 38, conductor 51, contacts 52 and 56, armature 54 and conductor 57 to binding post 58. If it is the other circuit that is selected, then the circuit is from binding post 50 to conductor 49, contact 46, switch plate 38, conductor 51, contacts 52 and 56, and conductor 57 to binding post 58. Conductor 60 leading from binding post 61 to the conductor 57, constitutes means for energizing the magnets 55 from a remote point in order to break the circuit at the contacts 52 and 56 after the electrical impulse created by the closing of one or the other circuits just described has accomplished its work.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:—

1. In a device of the character described, the combination with a rotative shaft, of means for imparting movement thereto in unison with the rise and fall of a liquid level, a switch, a member carried by said shaft having a plurality of projections arranged to engage and actuate said switch, a weight, means connected to said member for engaging said weight and lifting the same, said first named member having lost motion engagement with said shaft.

2. In a device of the character described, the combination with a rotative shaft, of means for imparting movement thereto in unison with the rise and fall of a liquid level, a switch, a member carried by said shaft having a plurality of projections arranged to engage and actuate said switch, a weight, means connected to said member for engaging said switch and lifting the weight, a circuit of which said switch forms a part, a circuit closing member included in said circuit, means for actuating said member electrically in one direction and mechanically in the opposite direction, and a latch arranged to be released by said weight and which serves to hold said circuit closing member in its open position against action of said mechanical means.

3. In a device of the character described, the combination with a rotative shaft, a pulley carried thereby, a float, and a connection whereby the movements of said float are imparted to said shaft, a member carried by said shaft having a plurality of peripheral projections, a pivotally mounted switch member, a pair of pivoted levers, an arm extending between said levers and carrying a member arranged to be engaged by said peripheral projections, a pivoted weight, and means carried by each of said levers for engaging said weight so that movement of either of said levers under the influence of said peripheral projections will result in lifting said weight.

4. In a device of the character described, the combination with a rotative shaft, a pulley carried thereby, a float, and a connection whereby the movements of said float are imparted to said shaft, a member carried by said shaft having a plurality of peripheral projections, a pivotally mounted switch member, a pair of pivoted levers, an arm extending between said levers and carrying a member arranged to be engaged by said peripheral projections, a pivoted weight, means carried by each of said levers for engaging said weight, so that movement of either of said levers under the influence of said peripheral projections will result in lifting said weight, and a lost motion connection between said shaft and the member which carries said peripheral projections.

5. In a device of the character described, the combination with a rotative shaft, of means for imparting movement thereto in unison with the rise and fall of the liquid level, a member carried by said shaft having a plurality of projections arranged to engage and actuate said switch, a weight, means actuated by said member for engaging said weight and lifting the same, a circuit of which said switch forms a part, a circuit closing member included in said circuit, means for actuating said member electrically in one direction and mechanically in the opposite direction, a latch arranged to be released by said weight and which serves to hold said circuit closing member in its open position against action of said mechanical actuating means, an indicating pointer and connections between said indicating pointer and said shaft, whereby movement of said shaft is transmitted to said pointer.

6. In a device of the character described, the combination with a movable fluid controlled member, of a switch member actuated thereby, a circuit in which said switch member is included, a magnet, an armature bar for said magnet which constitutes a circuit closing element disposed in said circuit, spring means for drawing said armature bar away from said magnet, a latch for holding said armature bar in the position to which it is drawn by said magnet against the tension of said spring, and a latch releasing mechanism comprising power storing means, actuated by said switch when said switch is moved, acting under the influence of the stored power to release the latch after the movement of the switch is completed.

7. In a device of the character described, the combination with a float, of a rotative shaft, means for imparting movement to said shaft in unison with the movements of said float, a pivotally mounted switch, a pivoted weight, means carried by said shaft adapted and arranged to lift said weight upon a predetermined movement of said shaft in either direction, a pair of contact elements, into engagement with one or the other of which said switch is moved, a pair of circuits leading from said contact elements, and a circuit closing member common to both of said circuits.

8. In a device of the character described, the combination with a float, of a rotative shaft, means for imparting movement to said shaft in unison with the movements of said float, a pivotally mounted switch, a pivoted weight, means carried by said shaft adapted and arranged to lift said weight upon a predetermined movement of said shaft in either direction, a pair of contact elements, into engagement with one or the other of which said switch is moved, a pair of circuits leading from said contact elements, a circuit closing member common to both of said circuits, and electrical means for actuating said circuit closing element to open said circuit.

9. In a device of the character described, the combination with a movable switch, of a pair of contacts, into engagement with one or the other of which said switch is arranged to be moved, a float, a member actuated by said float, means engaged by said member for shifting said switch, a pair of circuits leading from said contacts and of which said switch forms a part, a circuit closing member common to both of said circuits, means for holding said circuit closing member in its open position, means normally tending to hold said circuit closing member in its closed position, a restraining means for said circuit closing element, and mechanism actuated by the switch closing means for releasing said restraining member.

10. In a device of the character described, the combination with a rotative shaft, a float, means for imparting movement from said shaft to said float, a disk carried by said shaft, projections carried by said disk, a pair of pivoted levers, a connecting arm between said pivoted levers, means carried by said arm arranged to be engaged by said projections, a pivoted switch, means carried by said arm arranged to shift said switch, a pivoted weight, means carried by each of said levers for engaging said weight to lift the same, a latch arranged in the path of movement of said weight, an electromagnet, an armature for said electromagnet arranged to be engaged by said latch and to be restrained thereby, a pair of contact members one of which is carried by said armature, a spring normally tending to move the contact member of the armature into engagement with the other of said contact members, and a circuit in which said contact members and said switch are included.

11. In a device of the character described, the combination with a fluid controlled movable element, of a circuit closing switch element, a circuit in which said switch element is located, connections between said switch element and said movable member for moving said switch element by the action of said movable member, an additional circuit closing element in said circuit, and a member actuated in one direction by the said connections and acting in the other direction to operate the last named circuit closing element to close the circuit, whereby the circuit is closed by the switch before it is closed by said additional circuit closing mechanism.

12. In a device of the character described the combination with a fluid controlled switch, a circuit in which said switch is located, an additional circuit closing mechanism in said circuit, means for shifting said switch and a swingingly mounted member actuated by gravity in one direction and actuated by the switch actuating mechanism in the opposite direction, the swingingly mounted member serving when moving under the influence of gravity to operate the additional closing mechanism to close the circuit after the switch has been moved.

13. In a device of the character described the combination with a fluid controlled rotative shaft, a member carried by said shaft having peripheral projections, a pivoted switch, levers arranged to be engaged by said peripheral projections to be actuated thereby to move said switch, a pivotally mounted weight, means carried by said levers for engaging said weight and actuating the same, a circuit controlled by said switch, an additional circuit closing mechanism in said circuit, a restraining means normally tending to hold said circuit closing mechanism in position to open the circuit, said restraining means being arranged in the path of movement of said weight, the member having peripheral projections having lost motion engagement with said shaft.

14. In a device of the character described, the combination with a rotative shaft, of means for imparting movement thereto in unison with the rise and fall of a liquid level, a switch, a member carried by said shaft having a plurality of projections to engage and actuate said switch, a weight and means actuated by said member for engaging said weight, and lifting the same.

In testimony whereof I affix my signature.

SETH Q. KLINE, Jr.

Witnesses:
FRANK G. CAMPBELL,
LOUDOUN CAMPBELL.